Dec. 12, 1950 — D. F. SMALLEY — 2,534,150
DYNAMOELECTRIC MACHINE
Filed Nov. 3, 1949
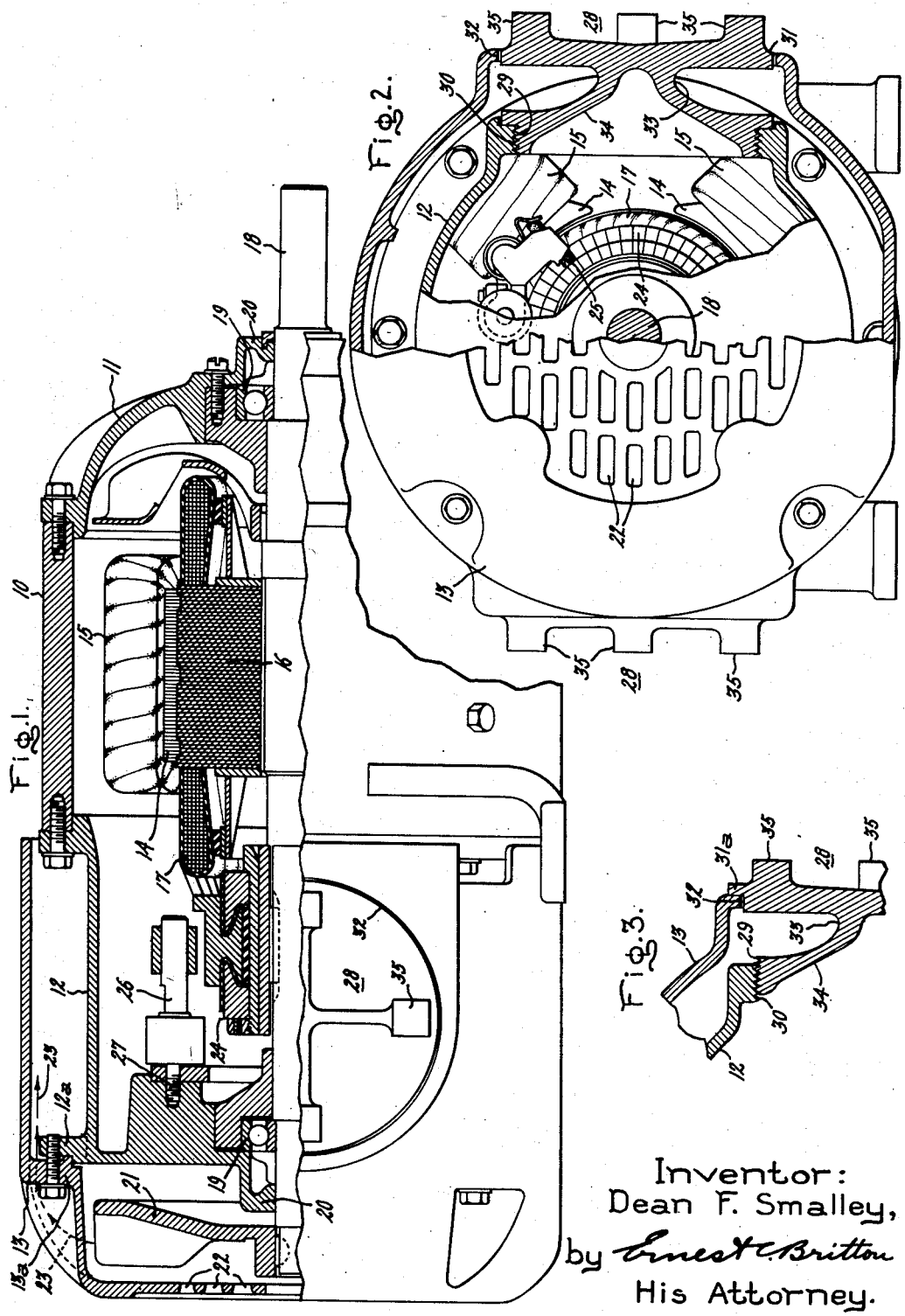
Inventor:
Dean F. Smalley,
by Ernest C. Britton
His Attorney.

Patented Dec. 12, 1950

2,534,150

UNITED STATES PATENT OFFICE 2,534,150

DYNAMOELECTRIC MACHINE

Dean F. Smalley, East Lynn, Mass., assignor to General Electric Company, a corporation of New York Application November 3, 1949, Serial No. 125,186

4 Claims. (Cl. 172—36)

1

My invention relates to dynamoelectric machines and has particular significance in connection with totally enclosed explosion proof direct current motors.

In dynamoelectric machines of the direct current type, it is conventional to provide a commutator and commutator brushes. In servicing the machine the brushes must, from time to time, be adjusted or replaced and this requires access to the commutator end of the machine. On the other hand, governmental regulating bodies and others dictating safety requirements for electrical machines (which are apt to be used in hazardous locations) are very strict as to the seal which must be provided by any removable cover on a totally enclosed machine. Furthermore, when dynamoelectric machines are totally enclosed (as for explosion-proof design) the problems of cooling are multiplied and it is conventional to provide an outer (i. e., outside of the sealed enclosure) fan cover to direct air over the surface of the machine and thus assure that the air path will be confined closely to the inner housing surface so that the latter can (by convection) readily dissipate the heat generated internally during operation. This outer fan cover has heretofore complicated the problem of providing ready access to hand holes. In order to service the brushes on explosion-proof motors, separate removable covers on the outer fan housing and on the sealed inner enclosure of the motor have heretofore been provided.

It is an object of the present invention to provide simple and inexpensive means for overcoming the above mentioned difficulties.

A further object of the present invention is to provide a direct current dynamoelectric machine of explosion proof and outer fan cover design wherein ready access may be had to any particular brush location by merely removing a single cover while, at the same time, during normal operation of the machine such cover allows maximum heat convection from inner air path to outer air flow.

These and other objects are met in the illustrated embodiment of my invention by each of a plurality of hand hole covers which screw into the inner (i. e., explosion proof) housing and also form a relatively close seal with the outer fan housing. Each such cover tapers into a narrow neck portion between the part thereof designed to fit into the inner housing and the part thereof designed to mate with the outer housing, thereby allowing the maximum amount of cooling air to flow between the housings. Furthermore, the in-

2 ner end of the cover is hollowed out to provide minimum thickness and maximum convection area between inner and outer ventilating medium circuits.

Other objects and advantages will become apparent and my invention will be better understood from consideration of the following description taken in connection with the accompanying drawing in which Fig. 1 is a longitudinal view, partly in section, of a totally enclosed so-called "fan-cooled explosion-proof" direct current dynamoelectric machine; Fig. 2 is an end view, partly in section, of the machine shown in Fig. 1; and Fig. 3 is a partial view of a modified arrangement.

As shown in the drawing the machine has an inner casing comprising a stator yoke or frame 10 with an end bell 11 bolted to one end thereof, and an elongated inner housing 12 at the opposite end, all of the above forming an "explosion-proof" enclosure. Inner housing 12 is surrounded by an outer housing or fan cover 13. The machine frame 10 is provided with a plurality of salient field poles 14 having field pole windings 15 adapting the poles to react electrodynamically with a rotatable portion comprising a laminated rotor core 16 of magnetic material, a rotor winding 17, and a shaft 18 supported within the inner frame end members 11 and 12 by bearings 19, with these inner frame end members (11 and 12) terminating in annular seals 20 around the shaft. The shaft is adapted to drive a so-called outer fan 21, which is adapted to draw ambient air in through a screened opening 22 at the axial end of outer cover 13 and direct this air (as indicated by arrows 23) between mounting lugs 13a and 12a, over the periphery of inner housing 12, and out of the machine over the outer periphery of frame 10.

The machine is provided with a conventional collector comprising, in the illustrated embodiment, a commutator assembly 24, secured to be rotatable with shaft 18, with the commutator adapted to be contacted by brushes 25 (Fig. 2) secured in brush holders 26 which are mounted on an inner face of end housing 12 as by studs 27.

As previously intimated, it is very necessary in a machine of this type to have ready access to the brush locations to provide for periodic adjustment of spring pressure and replacement of worn brushes, and, at the same time, it is necessary that there be a positive sealing engagement between the inner housing (10, 11 and 12) and any part such as a hand hole cover removable therefrom. Accordingly, I have provided a removable closure member 28 comprising an inner externally threaded portion 29 designed to engage with corresponding threads 30 provided in inner housing 12. Part 28 also comprises an outer flange portion 31 which substantially seals a corresponding hole 32 provided in the outer or fan cover 13. In the illustrated embodiment two such closure members 28 are shown although obviously one or any number of such covers may be provided so long as they, selectively, afford ready access to the brushes and make a suitable seal with the explosion-proof housing. In each cover the threaded flange 29 and the outer flange 31 (or 31a of Fig. 3) are joined by a neck portion 33 which is narrowed to provide a minimum of interference with the flow of ventilating medium forced over inner housing 12 by outer fan 21. In order to provide a large heat exchange area (and incidentally reduce the weight of the fitting) the inner face of each part 28 is dished out as indicated at 34. Each part 28 is provided with means such as four lugs 35 for unscrewing the part by means of a wrench, crow bar or other tool.

While in the embodiment shown in Figs. 1 and 2, a slight clearance is provided between flange portion 31 and outer casing hole 32 and the cover 28 seats on a flange of enclosure 12, in the modification indicated by Fig. 3, hand hole cover (28) outer flange 31a is notched to seat on the fan cover 13 around the circumference of hole 32 and the hand hole cover is not seated on the inner housing 12 which it threadedly engages. The modification of Fig. 3 prevents dripping water and dirt from flowing around the hand hole cover to cause an accumulation of dirt and mud which might eventually plug up the air spaces provided between the inner and outer housing.

In operation, cooling air from the outer fan 21 can pass almost without obstruction around each hand hole cover 28, inner neck 33 thereby cooling these covers as well as the outer surface of the inner explosion-proof housing 12, and meanwhile the inner air flow will contact the hand hole covers within the hollows 34 which give a large radiating surface together with a minimum thickness of heat conducting metal.

While I have illustrated and described a particular embodiment of my invention, various modifications thereof will be apparent to those skilled in the art. I desire it to be understood, therefore, that my invention is not to be limited to the particular arrangement disclosed and I intend in the appended claims to cover all modifications which do not depart from the spirit and scope of my invention.

What I claim as new and desire to secure by Letters Patent of the United States is:

1. In a dynamoelectric machine having internal members subject to having heat generated therein during operation and having a collector subject to sparking during operation and having an explosion-proof inner housing enclosing said internal members and said collector and having an outer ventilating medium housing spaced from said inner housing to provide for the flow of ventilating medium between said housings, means affording access to the interior of said inner housing, said means comprising an opening in said outer housing and a co-axial opening in said inner housing, and a unitary closure member for said openings, with said closure member adapted to threadedly engage the edges of said opening in said inner housing to form a fluid tight seal with said inner housing to prevent explosive mixtures in said ventilating medium being affected by said sparking, said closure member having an outer flange adapted to substantially close said opening in said outer housing and having a narrowed neck portion to provide minimum interference to the flow of said ventilating medium over said inner housing thereby to allow maximum transference of said heat generated in said internal members.

2. In a dynamoelectric machine having a stator member, a rotor member and a collector subject to sparking and having a totally enclosing inner casing with an opening formed therein for access to the interior of said machine, an outer casing surrounding a portion of said inner casing and spaced therefrom for providing a ventilating passage over a portion of the outer surface of said inner casing, said outer casing having an opening formed therein co-axial with said inner casing opening, and a closure member for closing both of said openings, said closure member comprising a first flanged portion adapted to provide a sealing engagement with and to seat upon said inner casing and a second flanged portion adapted to substantially seal said outer casing opening with a narrow neck portion joining said first and second flanged portions thereby to provide for maximum flow of ventilating medium through said ventilating passage over said outer surface of said inner casing.

3. In a dynamoelectric machine having a stator, a rotor, and a collector and having an explosion-proof inner housing surrounding said rotor and stator and collector and having an outer ventilating medium housing, means affording access to the interior of said inner housing, said means comprising an opening in said outer housing and a co-axial opening in said inner housing, and a unitary closure member for said openings, with said closure member having a first flanged portion adapted to threadedly engage the edges of said opening in said inner housing to form a fluid tight seal with said inner housing and having a second flanged portion adapted to seat upon and close said outer housing opening and said closure member having a peripheral groove formed therein intermediate said flanged portions and having the end of said closure member adjacent said first flanged portion dished out to provide maximum radiating surface thereon and minimum heat conducting section therethrough.

4. A dynamoelectric machine having a commutator and a plurality of brush positions for said commutator, an inner explosion-proof housing surrounding said commutator and brush positions and provided with means for gaining access to each of said brush positions, said means comprising a plurality of sealable hand holes, an outer fan for cooling said machine, an outer fan cover arranged adjacent the commutator end of said machine for directing ventilating medium from said fan over the outer surface of said inner housing, said fan cover having a plurality of holes each co-axial with one of said inner housing hand holes, and a plurality of closure members each having an inner flange portion adapted to threadedly engage said inner housing to seal one of said inner housing hand holes and having an outer flange portion adapted to substantially close the corresponding hole in the outer fan cover, each of said closure members having a narrow neck portion intermediate said flange portions and a dished out end adjacent said inner flange portion to permit the maximum transfer of heat from within said inner explosion proof housing to said ventilating medium passing over the outer surface of said inner housing, and means including a plurality of crow bar lugs arranged on the outer end of each of said closure members for affecting the engagement or disengagement thereof with the respective threaded inner housing hand hole.

DEAN F. SMALLEY.

REFERENCES CITED

The following references are of record in the file of this patent:

UNITED STATES PATENTS

| Number | Name | Date |
|---|---|---|
| 703,631 | Zehringer | July 1, 1902 |
| 1,362,049 | Starker | Dec. 14, 1920 |
| 1,730,202 | Geyer | Oct. 1, 1929 |
| 2,414,532 | Johns | Jan. 21, 1947 |

FOREIGN PATENTS

| Number | Country | Date |
|---|---|---|
| 466,393 | Germany | Mar. 2, 1931 |
| 153,903 | Switzerland | July 1, 1932 |